United States Patent [19]
Richardson

[11] 3,851,489
[45] Dec. 3, 1974

[54] LINE LAYING APPARATUS

[76] Inventor: Kenneth Richardson, 111 W. First St., Bldg. Suite 512, Vandalia, Ohio 45402

[22] Filed: June 28, 1973

[21] Appl. No.: 374,340

[52] U.S. Cl. ............................................. 61/72.6
[51] Int. Cl. .............................................. F16l 1/00
[58] Field of Search .......... 61/72.6, 72.5, 72.7, 72.1

[56] References Cited
UNITED STATES PATENTS
3,802,210   4/1974   D'Andrea ......................... 61/72.6
FOREIGN PATENTS OR APPLICATIONS
547,318    8/1942   Great Britain ..................... 61/72.6

Primary Examiner—Jacob Shapiro
Attorney, Agent, or Firm—Jerome P. Bloom

[57] ABSTRACT

Line or cable laying apparatus for underground placement of lines characterized by a plurality of channel-shaped elements defining guide chutes separably coupled in a nested or piggy-back arrangement. Each superposed guide chute forms a gate member for an underlying chute. The elements of the assembly feature a can construction which facilitates the ready operation of the gate members. This last feature enables a quick and direct access to any underlying chute to separate a line therefrom, as and when required, without need for a cutting of the line.

12 Claims, 7 Drawing Figures

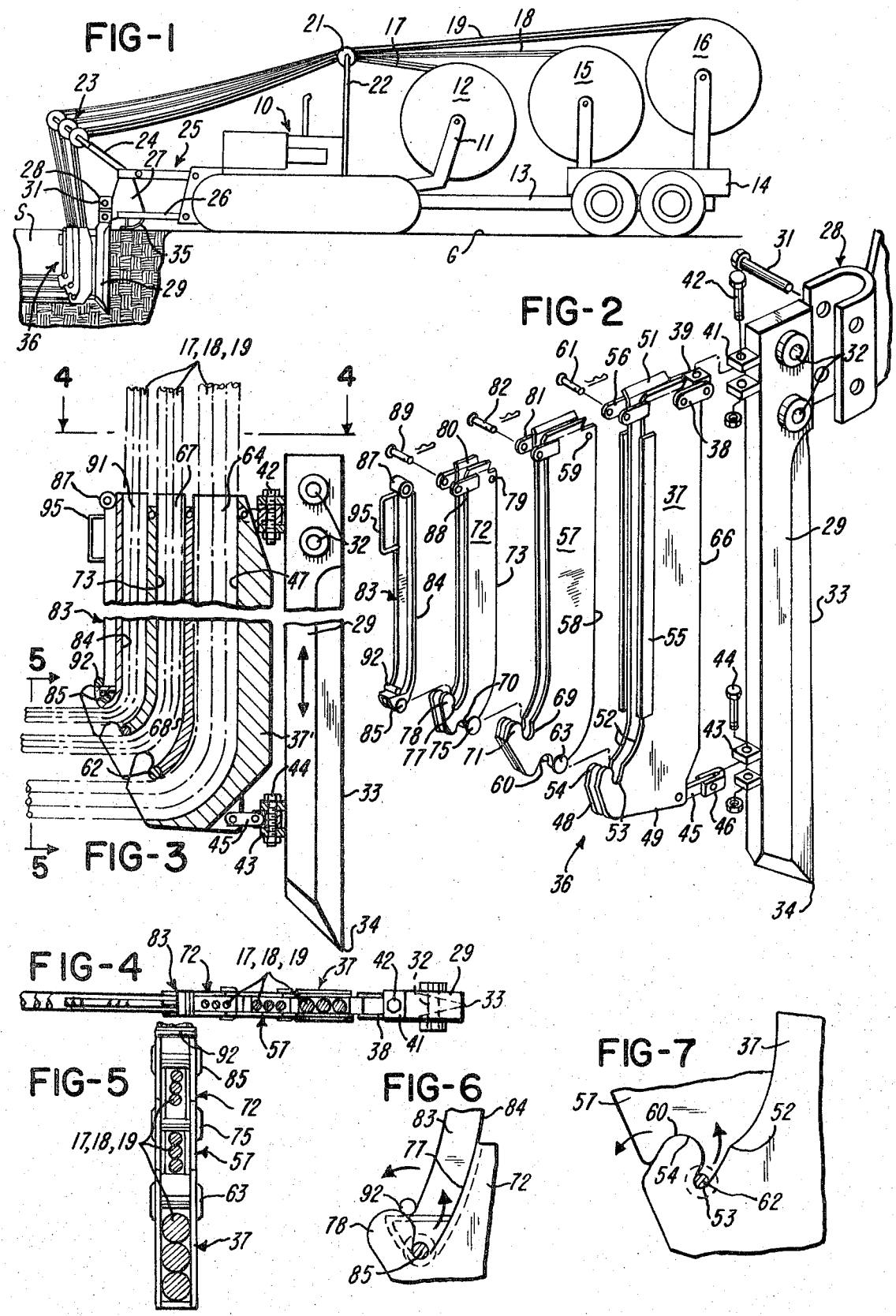

LINE LAYING APPARATUS

BACKGROUND OF THE INVENTION

This invention relates to equipment for laying underground lines, cables and the like and more particularly to improvements in line laying apparatus of the type in which a line guide is moved in a close coupled and following relation to a plow or trenching type blade. In use of such equipment, as the blade is powered to cut a trench in the earth surface, the guide functions as a channelling device for lines which are fed into the trench.

Equipment of the class described has particular advantage where it is desired to make a below ground installation of cables, wires, flexible conduit or the like across fields and lawns with minimal disturbance of ground surface. As designed, the line guide accommodates itself to a narrow slit trench formed by a knife-like cutting blade. The width of the trench need only slightly exceed the line diameter as dictated by the width of the guide. Prior art line laying equipment has been developed to the point it is highly effective for use in many applications. However, such equipment has been found to have certain disadvantages which the improvements of the present invention overcome. For example, the prior art equipment has exhibited an inability to effectively and properly lay groups of lines at respectively different well defined depths below a ground surface. Further, the prior art apparatus has limited line carrying capacity and exhibits little flexibility in use. For example, in feeding a plurality of lines below a ground surface at a particular level a point is often reached where one or more of the plurality of lines must be directed in a sense different than the others. In accordance with conventional practice, and in use of the prior art equipment, this creates a requirement that the lines which must be separated and redirected must be cut and then spliced, before they can be extended in a different direction. Further, the nature of the prior art equipment has dictated that in order to lay a plurality of lines at definitely spaced levels the equipment must make several passes over the same route, the equipment being modified between passes for the making of progressively more shallow cuts for the feeding of the different lines to place them at different depths.

There have been proposals in the past to feed a plurality of individual lines through a single chute wherein the lines are separated by fixed partitions. This, however, has not satisfactorily solved the above problems. The prior art structure inherently precludes a well defined placement of lines at different levels in a single pass and it does not eliminate the need for cutting and splicing under the circumstances above described. The procedure of cutting and splicing is not only time consuming but requires special skills and adds substantially to installation costs. The cost of a single cut and splice can run well in excess of $100.00.

SUMMARY OF THE INVENTION

The instant invention preserves the advantages and features of prior art line laying equipmenet and adds thereto the capabilities of simultaneously and precisely laying multiple lines at different below ground levels. It also enables the divergence of lines in the course of a continuing line laying procedure without the need for cutting and splicing.

In the use and construction of the invention apparatus, a base line guide placed in a connected backing or following relation to a cutting blade has superposed thereon, in an aligned, piggy-back relation, a plurality of gate members serving dual functions. The gate members cooperate with the base guide and with one another to define a plurality of essentially co-planar line guiding chutes, each of which may direct a plurality of lines of the same or varied character. Terminal or line-out ends of such chutes provide that the separated lines respectively emerging from the chutes, singly or in groups, are in a spaced relation to inherently position at different depths in a forming slit. The invention enables that those depths be dictated by the nature of the piggy-back arrangement and selective positioning of the gate members. As provided, each gate member is separately removable to expose the underlying line guiding chute whereby to facilitate placement of lines in and displacement of lines from such chute. The elements of the line guide assembly so provided include interengageable cooperating parts designed to facilitate the separation of the gate members even under the most difficult conditions. The relationship of the parts is such to limit the opportunity for earth materials to reach and compact within confines thereof. Also, the interrelation of the line guide to the related cutting blade is such to avoid stress in mounting the line guide to the cutting blade.

A primary object of the invention is to provide an improved line laying apparatus which is economical to fabricate, more efficient and satisfactory in use, adaptable to a wide variety of applications and unlikely to malfunction.

Another object of the invention is to provide line laying equipment having a capability of laying lines such as cables, flexible tubing or the like under the ground in a well defined separated relation.

A further object of the invention is to provide equipment for use in laying lines under ground having the capability of guiding multiple lines either together or in a separated relation and to permit the extraction of one line to continue the laying thereof in a direction separate from the others without the need for cutting or splicing the line.

Still another object of the invention is to provide a line guide in which multiple lines may be guided in a separated relation by means facilitating the lifting out of one or more lines from a selective level within the line guide.

An additional object of the invention is to provide a new line guide for use in line laying equipment including a plurality of guide chutes, some of which function as gate members which so interconnect to facilitate the quick formation of the unitary structure for feeding lines to a selective number of defined levels beneath the ground surface as well as a quick separation thereof when required.

Another object of the invention is to provide means establishing a relationship between a line guide and a cutting blade in advance thereof which inhibits a buildup of earth materials therebetween which could interfere with their proper function.

Another object of the invention is to provide apparatus of the type described possessing the advantageous structural features, the inherent meritorious characteristics and the mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is illustrated one but not necessarily the only form of embodiment of the invention, FIG. 1 is a generally diagrammatic view of line laying equipment in accordance with an illustrated embodiment of the invention, shown in an operating position, transport and power means for such equipment being illustrated in a generally outline form;

FIG. 2 is a perspective exploded view of a cutting blade and line guide means in accordance with the illustrated embodiment of the invention;

FIG. 3 is a side elevational view of FIG. 2, shown partly in section and in a functional arrangement;

FIG. 4 is a view taken substantially on line 4—4 of FIG. 3;

FIG. 5 is a fragmentary view showing a front elevation of the apparatus of FIG. 3 taken substantially along the line 5—5 of FIG. 3;

FIG. 6 is a fragmentary view of a mounting and camming structure comprised in the connection between an outer gate element and an underlying guide chute; and FIG. 7 is a view similar to FIG. 6, showing a mounting connection between superposing gate-chute structures.

Referring to the drawings, a line laying assembly in accordance with the illustrated embodiment of the invention will ordinarily be used in conjunction with a self-propelled tractor type vehicle 10 travelling over ground surface G. By means of a bracket 11 the vehicle 10 is in a supporting relation to a relatively rotatable reel 12. A connection 13 places the vehicle 10 in a pushing or propelling relation to a wheeled cart 14 mounting other reels 15 and 16. The reels 12, 15 and 16 are indicated in a representative sense, it being intended merely to indicate that there may be multiple reels supplying multiple lines to a cable laying assembly in accordance with the present invention. In this connection, the reel 12 may have other like reels in an aligned relation thereto and the same is true of the reels 15 and 16. As shown, wound on the several reels are different lines which emerge as respective sets of lines 17, 18 and 19. For convenience of description, the multiple lines will hereinafter be identified as cables although it will be understood that they may take the form of wires, cables, flexible conduit or tubing or any similar line means which it is desired to lay beneath ground surface G. The cables 17, 18 and 19 are further representative in that multiple lines or cable may be wound on each reel so that each reel is the source of multiple or different type cables. Further, and as will be understood, the cables 17, 18 and 19 may have different structural characteristics in that they may differ in kind, in diameter and purpose. Thus, any combination of cables, wires and flexible conduit may be arranged or feed simultaneously from the several supported reels.

The cable means 17, 18 and 19 are guided over pulley means 21 mounted in a substantially overhead relation to the vehicle 10 by upright means 22. Continuing beyond pulley means 21 in a sense longitudinally of the vehicle 10, the cables extend to other pulley means 23 mounted by a support 24 to a vehicle extension 25. The latter has an adjustable pivot connection to what may be regarded as the rear of vehicle 10 including a framework 26 supporting a hydraulic pump-motor assembly 27. In a manner which it is unnecessary here to consider, pump-motor assembly 27 is suitably powered and controlled, and, when in operation, effects a rapid vertical reciprocating movement of a generally U-shaped bracket 28 to the rear thereof. The bracket 28 is in embracing relation to one end of a cutting blade 29. Installed bolts 31, received in openings 32 in the blade, mount the blade rigidly to the bracket 28. The arrangement places the blade 29 in a dependent relation to the bracket 28 and framework 26 and it will be understood in this connection that the blade may be caused to assume any desired angle with respect to framework 26. It is in the illustrated instance substantially perpendicular thereto. The blade has a cutting edge 33 facing forwardly or toward the vehicle 10, the cutting edge terminating in a pointed extremity 34. The blade is in cross section substantially rectangular in shape and has a thickness slightly to exceed the maximum diameter of a cable 17, 18 or 19.

The assembly comprising framework 26, hydraulic means 27 and cutter blade 29 accordingly is mounted for pivotal movement to the rear of vehicle 10. The assembly will tend of its own weight to drop downward to place the tip extremity 34 of the balde in a penetrating relation to ground surface G. Suitable power controls may be provided, operable from the vehicle 10 to apply raising and lowering impulses to the defined assembly. In operation, in the presence of a defined lowering pressure, and in response to operation of hydraulic means 27, the blade 29 is reciprocated in a substantially vertical sense to penetrate the ground to a depth corresponding approximately to the blade length, as indicated in FIG. 1. Combined additionally with an advancing movement of the vehicle 10 over ground surface, the result is to cause cutter blade 29 to form a narrow trench or slit in the ground which in a directional sense is in a following relation to movements of the vehicle 10. The formed slit is inherently self-closing so that passage of the equipment over ground surface leaves little indication of the operation performed. Additionally, the framework 26 terminates at its outer lower end in a pair of ski-like members 35 which dispose to either side of the blade 29. The members 35 act in a supporting relation to the trailing end of the framework 26, limiting downward movement thereof. Additionally, the ski-like members oppose the formation of furrows which may tend to result from the plow-like action of the blade 29 and restore ground surface G to its normal contour.

To the rear of cutter blade 29, in the sense of the direction of travel of vehicle 10, is cable guide means 36. This includes a chute member 37 of generally channel-like configuration. A closed side or base 37' of the member 37 is in a facing relation to what may be regarded as the rear or tracking edge of the cutter blade 29. An upper part thereof is normally above ground and has attached links 38 mounting a pivot block 39. The latter is received between a pair of vertically spaced ears 41 projecting from the adjacent edge of blade 29. A bolt 42 pivotally installs through the ears 41 and block 39. A similar connection, at a lower level, includes ears 43 and a bolt 44. In this instance, and in order that the connection may be within lateral dimensions of blade 29, a single link 45, to which is mounted an adapter 46, extends from member 37 and is received between ears 43. The arrangement, as will be evident, is one in which the cutter blade 29 and chute member 37 are connected for relative motion in plural senses. Thus, the chute is attached to the blade and accordingly is dragged with it in forming a ground slit. It is free, however, to make relative turning adjustments about a vertical axis as may be required to follow turning movements of the vehicle 10. Also, the chute is free to remain relatively stationary while the blade 29 reciprocates in its vibratory cutting action as effected by the hydraulic means 27. The chute accordingly is effectively isolated from the blade 29 although moving in a trailing relation thereto.

The chute member 37 has a flattened configuration conforming approximately to the dimensional thickness of the blade 29. It accordingly accommodates itself to and occupies the earth slit as formed by the vibrating and advancing blade. The blade and chute member tend to assume positions in which they dispose substantially in a common plane. That edge of the chute member which faces the blade 29 is, as noted, closed and there is formed thereby the base 37' connecting the closely spaced lateral walls of the chute presenting an internal base surface 47 of generally vertical orientation which toward what may be regarded as the lower end of the chute member is formed as a radius.

Thus, in its channel-like configuration, chute member 37 is comprised of parallel closely spaced wall segments 48 and 49 which are joined along their one longitudinal side edges, to form the closed side edge defining the interior base surface 47, and spaced at their opposite side edges to define an opening therebetween. The upper ends of the wall segments 48 and 49 are shown to be divergent to provide a throat 51 facilitating the entrance therebetween of one or more of the cable lines 17, 18 and 19. The open side edges of the wall segments have a configuration approximating that of the closed side edges and near the lower part of the chute member they are each formed with a complementary radius or curved portion 52. Located at low points of the curved portions 52 are recesses 53, one in each of the wall segments. Beyond recesses 53 each wall segment terminates in a curved cam-like convexly formed shoulder 54 directed in a sense reversely of and over the curved portion 52 and the opening to the recess 53 and tapering off to a flat bearing surface defining the outermost end of gate-chute member 57. Along vertically extended portions of the open side edges of the segments 48 and 49 are extension strips 55 which serve a confining function as will be further described. Spaced above the upper ends of strips 55, adjacent throat 51, are bracket arms 56. The latter rigidly attach to the wall segments 48 and 49 and project therefrom in parallel relation, in what may be considered a sense rearwardly thereof.

Bracket arms 56 provide means to hinge thereto a gate member 57. Member 57 has a configuration corresponding approximately to that of the chute member 37 and is adapted to mount thereto in a nested, piggyback, conforming relation. Thus, gate member 57 has a channel-like shape including spaced parallel side wall segments the nesting side edges of which are bridged by a wall 58. The closed side edge of member 57 is received between extension strips 55 in a manner to place closed wall 58 in a substantially closing relation to the open side edge of chute member 37. This places the side wall segments of member 57 in an aligned relation to wall segments 48 and 49. The upper end of gate member 57 has a lateral opening 59 adjacent the closed side edge thereof adapted to be received between bracket arms 56. The arms 56 have openings which align with the opening 59 to accommodate the passage therethrough of a bolt 61. This produces a hinged connection of the member 57 to the chute member 37. Toward its lower end, at the heel thereof, the gate member 57 has a transversely fixed stud-like portion 62 to the outer ends of which are integrated relatively expanded disc-like head formation 63.

To assemble the gate member 57 to the chute member 37, stud 62 is seated in recesses 53 in the side wall segments 48 and 49 whereupon the gate member 57 may be pivoted on the stud portion 62 to a position closing the open side edge of chute member 37. At this time upper transverse opening 59 positions between and in alignment with the openings in the bracket arms 56 to receive therethrough the bolt 61. The disc-like head formations 63 position outwardly of the wall segments 48 and 49 in a manner to confine the wall segments in the area thereof and to function to limit any tendency of the wall segments to spread or expand in an outward sense during the operation of the subject equipment. Adjacent and forwardly of the stud portion 62, the base portions of the wall segments of member 57 are recessed at 60 to fit over conforming cam surfaces 54 on the respective wall segments 48 and 49. The construction and arrangement of the parts 37 and 57 are such that one blends to the other in a relative integrating fashion.

Accordingly, gate member 57 effectively closes the open side edge of the chute member 37 and defines therewith an interior chute or cable guide passage 64, the line-in portion of which is defined by the vertically orienting throat portion 51 and the line-out portion of which is represented by a horizontal orienting opening 65 defined by superposing portions of the gate wall 58 and the chute member wall surface 47. The chute passage 64 will have a width, or distance from side to side thereof, conforming to the maximum expected diameter of a cable or the like 17, 18 or 19 which may be introduced and has a front to back dimension which may be of any selected distance in accordance with a number of cables that one may desire to put therethrough.

Gate member 57 is, as will be observed, readily removable on withdrawal of bolt 61, whereupon it may be rocked on the cam surfaces 54 which are so configured to insure a simple and effective means assisting in the dislodgement of and breaking free of the stud-like portion 62 from the recesses 53. This removal of the gate member 57 fully exposes the chute 64 for either a laying in of cables or a lifting up thereof through the open side edge of chute member 37.

As indicated gate member 57 has a configuration corresponding substantially to that of chute member 37. Accordingly it can function not only as a gate member but as a chute member per se defining a second line guide passage 67. The passage 67 will be in a substantially co-planar relation to passage 64 but separated therefrom by the wall 58. Wall 58 has an interior surface 68 having a curvature generally conforming to that of wall surface 47 and with similar effect, that is to guide admitted cables from the position of vertical orientation to a position of horizontal orientation. At the open side edges thereof the side wall segments of the gate member 57 are curved like the side wall segments 48 and 49 and incorporate recess means 69 adjacent terminal edge portions forming cam shoulders 71. Recess means 69 and cam shoulders 71 correspond substantially to the elements 53 and 54 of chute member 37.

Referring in particular to FIG. 2 of the drawings, a further gate-chute member 72, having a configuration similar to that of the member 57, is adapted for a piggyback nested mount to the member 57 in the same manner that the member 57 mounts to member 37. Structurally the member 72 is substantially identical to member 57 and cooperates therewith to the same ends as does the member 57 with respect to member 37. Thus, the gate member 72 is comprised of closely spaced generally parallel side wall segments bridged at their one side edges by a closure wall 73 which nests in the open side edge of the member 57 to combine therewith in forming the guide passage 67. Also, the heel portion of the member 72 is formed similarly to the heel portion of the member 57 to incorporate therein a comparable stud-like portion 74 including relatively expanded disc-like head portions 75. Forwardly of the stud-like portion 74, which is adapted to seat in recess means 69 of the gate member 57, the side wall segments of the member 72 are formed with arcuate recesses 70 the edges of which are formed to bear on and fit snugly over the cam-like shoulder portions 71 on the wall segments of the member 57. The lower curved extremity of the rear edges of the wall segments defining the open side of the member 72 are respectively formed with recesses 77 and shoulder formations 78 having a configuration somewhat different than that of recesses 53, 69 and shoulders 54, 71. In this case the shoulders 78 are formed to provide arcuate bearing surfaces the length of which is in excess of 180°, commencing at the root of the adjacent recess 77 and forming the outermost end of the gate-chute member 72.

The member 72 includes an expanded throat portion 80 at its upper end, to the rear of which is a through opening 79 received between parallel bracket arms 81 projected from the side walls of member 57. As the opening 79 is positioned between aligned openings in the arms 81, there is thrust therethrough a bolt 82. The member 72 is thereby pivotally connected to the member 57. This last will occur as the member 72 has its stud portion 74 seated in recesses 69 in the side wall segments of the member 57 and is rocked to a nested piggy-back relation as was the member 57 to the base member 37.

The open side edge of the member 72 is closed by a gate member 83. The member 83 has a closing base surface 84 the configuration of which conforms to the configuration of the open side edge of the member 72. At the lower or heel portion of the member 83 is a transversely oriented stud-like portion 85 adapted to seat in the recesses 77 in the side wall segments of member 72. The stud-like portion 85 has laterally projected expanded portions which seat to the outer sides of the side wall segments of the member 72 to contain the same and prevent their spreading. The gate member 83 is distinguished from the preceding gate members in that it has a substantially plate-like form and there is integrated therewith, at its upper end, a tubular boss 87. The latter is received between a pair of bracket arms 88 which project rearwardly of the member 72 and correspond to bracket arms 56 projecting rearwardly from the member 37 and the similar bracket arms projecting rearwardly of the member 57. A pivot pin 89 extends through openings in the bracket arms 88 which align with the opening through the tubular boss 87. In this manner, the outer gate member 83 is hinged to the member 72. This connection will take place upon positioning the stud-like portion 85 of the member 83 in the recesses 77 formed in the open side edges of the wall segments of the member 72 and, bearing on the side edges the gate member 83 is rocked into position to serve its closing function. As it is closed, the gate member 83 forms with the member 72 a third line passage 91. The lowermost extremity of the plate member 83 is formed as a bifurcation and in side view has a generally triangular configuration the base portion of which is uppermost. Integrated with this base portion to seat transversely thereof is a pin-like member 92 the ends of which laterally project so that when the member 83 seats in a closing relation to the open side edge of the member 72, the ends of the pin 93 will seat to and bear on the shoulders 78. Further integrated with the member 83, at its rear or outer side face, towards its upper end, is a loop-like handle 95.

When one desires to remove the gate member 83, the handle 95 serves, once the pin 89 is removed, to form a lever arm of the member 83 the base of which is the pin 95. As is essential and will inherently occur in the use of the apparatus, the gate member will be tightly fixed and in the rocking motion outwardly of the member 72, the pin 95 and the shoulders 78 co-function to facilitate a breaking free of the gate member, irrespective of how tightly the parts are interrelated at this point in time.

The gate member 83 accordingly is a removable device and its configuration is such to form with a member 72 a third line guide passage wherein the upper or line-in opening is vertical and the lower or line-out opening is horizontal.

The assembly thus defined uniquely provides three distinctive levels at which lines of same or varied character may be directed horizontally from the line guide 36. Of course, the number of line guide passages which may be provided is not limited. They may be varied to suit the intended application by interposition of additional gate-chute members or removal of a gate-chute member.

It is to be noted that the invention by the very nature can enable variations in the front-to-back width or vertical separation of the line guide passages so as to facilitate a precise and predetermined arrangement of feed of lines in a continuous laying procedure. Almost any arrangement of placement of cables may be achieved in a very simple and economical fashion.

Particular attention is directed also to the manner of nesting the respective gate-chute and gate members to each other and the base line chute 37. The arrangement is such to facilitate quick assembly and easy disassembly without special tools or special fittings or connectors separate and apart from the chute and gate members themselves.

In use of the line guide means as above described, as noted, the free ends of selected cables included in the designation 17, 18 and 19 may be selectively initially threaded through the respective line gide passages without removal of the gate members or may be positioned in each line chute as the gate-chute members are assembled. In any case there results a unitary structure from the vertically spaced line-out openings of which the free ends of the cables are respectively threaded. Upon initially anchoring these free or leading ends of the cables, and with the line guide assembly fully unitized as described, the vibratory blade 29 may then be set in operation and the vehicle 10 set in motion. As the blade cuts a slit S in the ground and opens the ground thereby, the line guide 36 will of course be induced to follow, its special connection with the blade permitting that when the blade makes a turning or a lateral movement the line guide will follow. Advancing movement of the vehicle 10 will in any case cause the cables 17 through 19 to unwind from the associated reels and to be fed through the line guide passages. In the process the cables are redirected from a generally vertical orientation to a horizontal and vertically spaced orientation, depending on the line guide passage from which they exit. The work is continuous with the cables being continuously fed into the slit being formed as the vehicle 10 follows a selected path across the ground surface G. The earth material in the slit S will inherently close over the issuing cables and maintain the required spaced positioning thereof in a vertical sense from the beginning to the end of the run.

In the course of a continuing laying of cables as described, it is sometimes required to separate one or more of the cables to either form a terminal connection for a particular cable or to enable a cable or cables to be directed in a sense different than the other cables. When this occurs, it is a simple matter to disengage the necessary portions of the gate-chute members and physically remove the cable that must be removed without cutting or splicing it. A removed cable can then be continued in a different direction as that in which one continues to lay the original cables which were not removed.

Moreover, it will sometimes happen that the blade 29 will encounter an obstruction through which it cannot pass, in which event line laying equipment must make way for excavating tools. In such event also, instead of it being necessary to cut and reconnect the cables in a splicing operation to continue the procedure, the line guide assembly can be opened and the cables removed and the vehicle 10 displaced for placement of other excavating equipment. Once the necessary excavation takes place, the vehicle 10 can return to position and the cables be reoriented in the line guide in an obvious manner.

The facility and benefits of the invention apparatus should now be obvious. The invention structure is extremely flexible and enables a highly flexible process for laying continuous lines of varied character not heretofore available in the art.

It is a feature of the invention also that the simple and firm connection of one element to the other of the line guide produces a unitary structure the side walls of which are co-planar and firmly engaged to present a condition that precludes earth materials from entering to a degree to interfere with a proper and smooth functioning placement of lines. Since the closed side edge of the chute member 37 is configured to include an elongated exterior portion 66 in adjacent parallel relation to the trailing edge of blade 29 over a long portion of its length, a diminished opportunity is offered for earth materials to interfere here. The line guide is enabled thereby to follow closely, and without deformation of the slit, the movement of the blade.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A line guide for use in a line layer providing a blade adapted to mount a line guide in a connected following relation to said blade, comprising means defining a plurality of separate line guide passages, said means including a base guide and plural guide elements in an aligned conforming relation, said elements being separably related with one contained relative the other on a superposed positioning thereof and including means providing for relative displacement of said plural guide elements whereby to provide for a modification of said passages and access to said passages as and when needs require.

2. A line guide as in claim 1 wherein said elements are arranged to define a plurality of outlets for said line guide passages which are at predetermined definitely and differentially spaced levels.

3. A line guide as in claim 2 wherein said elements include interrelating portions bearing one on the other to facilitate their assembly and relative displacement.

4. A line guide for use in a line layer providing a blade adapted to mount a line guide in a connected following relation to said blade, said line guide including a chute member open to the rear thereof, a gate member removably mounted to said chute member in at least a partly closing relation to the rear thereof to define therewith a substantially enclosed first line guide passage, said gate member being formed to provide an added chute member open to the rear thereof, and means for closing said added chute member to the rear thereof to define therewith a second enclosed line guide passage having an exit opening in a separated spaced relation to the exit opening from said first line guide passage.

5. A line guide according to claim 4, wherein said last named closing means is another gate member formed to provide a further chute member and wherein means close said further chute member to the rear thereof to provide therewith a third enclosed line guide passage in a separated and spaced relation to said first and second line guide passages.

6. A line guide according to claim 5, and wherein said means closing said further chute member is a removable gate member, wherein the first said chute member and said removable gate members align with one another and form a unitary device having separable parts providing access to said chutes for a lifting out of guided lines through exposed open rear edges thereof.

7. A line guide according to claim 4, wherein said chute members have approximately vertically disposing upper line-in openings and approximately horizontally disposing lower line-out openings, said gate member having a portion formed on a radius to facilitate guiding of line elements through said first chute member from the line-in opening to the line-out opening, said portion of said gate member enforcing a separation of lines in said first and second chute members and having a dimension to establish a selected vertical spacing between guided lines emerging therefrom.

8. A line guide according to claim 4, wherein the first said chute member has a channel-like configuration, said gate member interfitting with to close an open side of the said first chute member and having longitudinally spaced apart locations of connection to said first chute member.

9. A line layer according to claim 8, wherein said gate member received in a closing relation to the open side of the first said chute member has means to bear on and embrace opposing side walls thereof to prevent spreading thereof, the said side walls of said chute member having recess means pivotally accommodating said bearing and embracing means, and interengageable means on said gate member and said chute member utilizing relative pivotal motion therebetween to force said bearing and embracing means out of said recess means.

10. A line guide for use in a line layer providing a blade adapted to mount a line guide in a connected following relation to said blade, said line guide including a first chute member mounting rearwardly of said blade to be in a substantially linear following relation thereto, said first chute member having a channel-like configuration providing an upper line-in and a lower line-out opening, a closed edge of said first chute member facing forwardly toward said blade and an open edge facing rearwardly, and a plurality of gate members aligning in a piggy-back relation to said first chute member and to one another, at least a first one of said gate members having a wall portion substantially to close the open edge of said first chute member and to define therein a first substantially enclosed line guide passage, and having further a chute forming portion of channel-like configuration providing a second chute member the closed edge of which is defined by said wall portion, said second chute member being open at an edge oppositely of said wall portion, and another of said gate members substantially closing said open edge of the said first one of said gate members to define therein a second substantially enclosed line guide passage in a spaced separated relation to the first, said second chute member having line-in and line-out openings at opposite ends thereof for passage of line means therethrough separate from line means accommodated in said first chute member, said gate members being removable for access to line means in said line guide passages selectively to lift out from and to re-install lines through open edes of said chute members.

11. A line guide according to claim 10, wherein the first said chute member and said gate members are configured in complementary relation to define first and second line guide passages in an in-line relation with portions formed on a radius to present line-out openings which are in a substantially vertically superposed and spaced relation.

12. A line guide for use in a line layer providing a blade adapted to mount a line guide in a connected following relation to said blade, said line guide including a line receiving chute member providing a generally vertically disposing line-in opening and trailing line means therefrom at a generally horizontally disposing line-out opening, said chute member having a side opening therein of longitudinal extent through which line means may be bodily lifted in a lateral sense from said chute member, and a plurality of gate members in a nesting relation to one another mounted in a closing relation to said side opening, a first one of said gate members closing said side opening and forming in conjunction with a second gate member another chute member receiving other line means for laying in spaced relation to the first said line means, said other chute member being in complementary conforming relation to the first said chute member, said gate members being removable for access to and lifting of said line means.

* * * * *

UNITED STATES PATENT OFFICE
CERTIFICATE OF CORRECTION

Patent No. 3,851,489          Dated December 3, 1974

Inventor(s) Kenneth Richardson

It is certified that error appears in the above-identified patent and that said Letters Patent are hereby corrected as shown below:

In the ABSTRACT, line 7, "can" is corrected to read -- cam --.

Col. 3, line 63, "or" is corrected to read -- to --.

Signed and sealed this 18th day of March 1975.

(SEAL)
Attest:

RUTH C. MASON
Attesting Officer

C. MARSHALL DANN
Commissioner of Patents
and Trademarks

FORM PO-1050 (10-69)